United States Patent [19]
Fukushi

[11] Patent Number: 5,827,587
[45] Date of Patent: Oct. 27, 1998

[54] MULTI-LAYER COMPOSITIONS HAVING A FLUOROPOLYMER LAYER

[75] Inventor: Tatsuo Fukushi, Woodbury, Minn.

[73] Assignee: Minnesota Mining and Manufacturing Company, St. Paul, Minn.

[21] Appl. No.: 873,763

[22] Filed: Jun. 12, 1997

Related U.S. Application Data

[62] Division of Ser. No. 293,469, Aug. 19, 1994, Pat. No. 5,656,121.

[51] Int. Cl.⁶ .............................. B32B 1/08; B32B 27/08; B32B 27/32; B32B 27/34
[52] U.S. Cl. .................... 428/36.6; 428/421; 428/520; 428/522; 277/227; 277/228; 277/229; 138/137; 138/141
[58] Field of Search .................. 428/36.6, 36.7, 428/36.9, 36.91, 421, 422, 480, 473.5, 483, 515, 520, 522; 138/137, 140, 141, 145, 146; 277/227, 228, 229

[56] References Cited

U.S. PATENT DOCUMENTS

| | | | |
|---|---|---|---|
| 3,923,574 | 12/1975 | Vercauteren | 156/192 |
| 4,234,644 | 11/1980 | Blake et al. | 428/204 |
| 4,335,238 | 6/1982 | Moore et al. | 526/254 |
| 4,548,867 | 10/1985 | Ueno et al. | 428/409 |
| 4,558,142 | 12/1985 | Holland et al. | 549/465 |
| 4,685,090 | 8/1987 | Krevor | 367/20 |
| 4,933,060 | 6/1990 | Prohaska et al. | 204/192.36 |
| 5,047,287 | 9/1991 | Horiuchi et al. | 428/248 |
| 5,170,011 | 12/1992 | Martucci | 174/47 |
| 5,242,976 | 9/1993 | Strassel et al. | 525/72 |
| 5,284,184 | 2/1994 | Noone et al. | 138/121 |
| 5,391,426 | 2/1995 | Wu | 428/246 |

FOREIGN PATENT DOCUMENTS

| | | |
|---|---|---|
| 0 185 590 | 6/1986 | European Pat. Off. . |
| 0 523 644 | 1/1993 | European Pat. Off. . |
| 0 551 094 | 7/1993 | European Pat. Off. . |
| 0 559 445 | 9/1993 | European Pat. Off. . |
| 0 597 120 | 5/1994 | European Pat. Off. . |
| 2 204 932 | 12/1991 | United Kingdom . |
| WO 93/01493 | 1/1993 | WIPO . |
| WO 94/12580 | 6/1994 | WIPO . |

OTHER PUBLICATIONS

Billmeyer, Jr., "Fluorine–Containing Polymers," *Textbook of Polymer Science*, 3$^{rd}$ ed., pp. 398–406, John Wiley & Sons, New York (1984).
Brullo, "Fluoroelastomer Rubber for Automotive Applications," *Automotive Elastomer & Design*, (Jun. 1985).
Brullo, "Fluoroelastomers Seal Up Automotive Future," *Materials Engineering*, (Oct. 1988).
"Fluorinated Elastomers," *Kirk–Othmer, Encyclopedia of Chemical Technology*, 3$^{rd}$ ed., vol. 8, pp. 500–515, John Wiley & Sons, New York (1979).
"Organic Fluorine Compounds," *Kirk–Othmer, Encyclopedia of Chemical Technology*, 3$^{rd}$ ed., vol. 11, pp. 20–21, 32–33, 40–41, 48, 50, 52, 62 and 70–71, John Wiley & Sons, New York (1980).

*Primary Examiner*—Vivian Chen
*Attorney, Agent, or Firm*—John A. Burtis

[57] ABSTRACT

A multi-layer composition comprising of a fluoropolymer layer, a hydrocarbon polymer layer, and an aliphatic di- or polyamine having a molecular weight of less than 1,000, wherein the fluoropolymer comprises vinylidene fluoride units; the hydrocarbon polymer is a polyamide, polyimide, or a functionalized polyolefin; and wherein substantially all of the di- or polyamine is located between the fluoropolymer and the hydrocarbon polymer layers, the amount of amine being sufficient to increase the adhesion of the two layers.

4 Claims, No Drawings

MULTI-LAYER COMPOSITIONS HAVING A FLUOROPOLYMER LAYER

This application is a divisional of U.S. Ser. No. 08/293,469, filed Aug. 19, 1994, U.S. Pat. No. 5,656,121.

The invention relates to multi-layer compositions comprising a fluoropolymer layer, in particular, a fluoropolymer comprising interpolymerized units derived from vinylidene fluoride. In another aspect, this invention relates to methods of improving the adhesion between the fluoropolymer layer and other dissimilar materials, such as polyamides or polyolefins.

Fluorine-containing polymers, or fluoropolymers, are an important class of polymers and include for example, fluoroelastomers and fluoroplastics. Within this class are polymers of high thermal stability and usefulness at high temperatures, and extreme toughness and flexibility at very low temperatures. Many of these polymers are almost totally insoluble in a wide variety of organic solvents. See, for example F. W. Billmeyer, *Textbook of Polymer Science*, 3rd ed., pp 398–403, John Wiley & Sons, New York (1984).

Fluoroelastomers, particularly the copolymers of vinylidene fluoride with other ethylenically unsaturated halogenated monomers, such as hexafluoropropene, have particular utility in high temperature applications, such as seals gaskets and linings. See, for example, Brullo, R. A., "Fluoroelastomer Rubber for Automotive Applications," *Automotive Elastomer & Design*, June 1985, "Fluoroelastomers Seal Up Automotive Future," *Materials Engineering*, October 1988, and "Fluorinated Elastomers," Kirk-Othmer, *Encyclopedia of Chemical Technology*, 3rd ed., Vol. 8, pp. 500–515, John Wiley & Sons, New York (1979).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, in wire, electrical components, seals, solid and lined pipes, and pyroelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, and 71, John Wiley & Sons, New York (1980).

Increased concerns with evaporative fuel standards have led to a need for fuel system components that have increased barrier properties to minimize the permeation of fuel vapors through automotive components such as fuel filler lines, fuel supply lines, fuel tanks, and other components of the emission control system of the engine. Various types of tubing have been proposed to address these concerns. In general, the most successful of these have been co-extruded multi-layer tubing.

Multi-layer compositions comprising a fluorinated polymer layer and a polyamide or polyolefin layer are known. See, for example, U.S. Pat. No. 4,685,090 (Krevor) which discloses laminate tubular articles which can comprise layers of fluorocarbon elastomers, and PCT Publication WO 93/1493 (LaCourt) which discloses a laminar film structure comprising a polyimide and a fluoropolymer.

A variety of methods have been used to increase the adhesion between a fluorinated polymer layer and a polyamide or polyolefin layer. For example, an adhesive layer can be added between the two polymer layers. U.S. Pat. No. 5,047,287 discloses a diaphragm, suitable for use in automotive applications, which comprises a base fabric having bonded to at least one surface a fluororubber layer by an adhesive which includes an acrylonitrile-butadiene or acrylonitrile-isoprene rubber having an amino group. See also, for example, European Patent Application 05595445 (Nishino et al.), UK Patent 2,204,932 (Washizu). See also U.S. Pat. No. 5,242,976 (Strassel et al.) which discloses coextruding vinylidene polyfluoride with an alkyl polymethacrylate and vinylidene polyfluoride composition.

Sometimes surface treatment of one or both of the layers is used to help increase bonding. For example, fluoropolymer layers have been treated with charged gaseous atmosphere followed by applying a layer of a second material, for example thermoplastic polyamide. See, for example, European Patent Applications 0185590 (Ueno et al.) and 0551094 (Krause et al.) and U.S. Pat. Nos. 4,933,060 (Prohaska et al.) and 5,170,011 (Martucci).

Blends of the two layers are sometimes used as an intermediate layer to help bond the two layers together. European Patent Application 0523644 (Kawashima et al.) discloses a plastic laminate having a polyamide resin surface layer and a fluororesin surface layer. The application states that it is difficult to make laminates having a polyamide layer and a fluororesin layer due to the incompatibility of the two materials. The laminate is prepared by the use of an intermediate layer of a blend of an aliphatic polyamide resin with a fluorine-containing graft copolymer.

SUMMARY OF THE INVENTION

Briefly, in one aspect, the present invention provides a method for increasing the adhesion of a first layer comprising fluoropolymer to a second layer comprising hydrocarbon polymer, comprising the steps of coating onto at least one face of at least one of said layers a composition comprising an aliphatic di- or polyamine of less than 1,000 molecular weight; and placing said layers together such that said amine composition is in contact with and between the two layers; wherein said fluoropolymer comprises interpolymerized units derived from vinylidene fluoride, said hydrocarbon polymer is a polyamide, polyimide, or a carboxyl, anhydride, or imide functional polyolefin, and said di- or polyamine is present in an amount sufficient to increase the adhesion between the two layers compared to compositions without said di- or polyamine. Preferably said first layer is predominately fluoropolymer and said second layer is predominately hydrocarbon polymers. Sometimes, in order to obtain sufficient adhesion, it may be desirable or necessary to further treat the resulting multi-layer composition, for example by additional heat or pressure.

In another aspect, the present invention provides a multi-layer composition comprising a first layer comprising fluoropolymer, a second layer comprising hydrocarbon polymer, and an aliphatic di- or polyamine of less than 1,000 molecular weight, wherein said fluoropolymer comprises interpolymerized units derived from vinylidene fluoride, said hydrocarbon polymer is a polyamide, polyimide, or a carboxyl, anhydride, or imide functional polyolefin, substantially all of said amine is located between and in contact with said two layers, and said amine is present in an amount sufficient to increase the adhesion between said layers compared to compositions without said di- or polyamine. The invention also provides articles comprising the compositions of this invention. Preferably said first layer is predominately fluoropolymers and said second layer is predominately hydrocarbon polymers.

The methods of this invention provide multi-layer compositions with improved inter-layer adhesion. The methods and compositions of this invention are particularly useful for making articles, such as tubing and hoses, suitable for use in motor vehicles, for example as fuel-line hoses.

DETAILED DESCRIPTION

Fluoropolymer materials suitable for use in this invention are those comprising interpolymerized units derived from vinylidene fluoride ("VF$_2$," or "VDF"). Preferably such polymers comprise at least 3% by weight of interpolymerized units derived from VF$_2$. Such polymers may be homopolymers of VF$_2$ or copolymers of VF$_2$ and other ethylenically unsaturated monomers.

Such VF$_2$ polymers and copolymers can be made by well-known conventional means, for example by free-radical polymerization of VF$_2$ with or without other ethylenically-unsaturated monomers. For example, the preparation of colloidal, aqueous dispersions of such polymers and copolymers is described, for example, in U.S. Pat. No. 4,335,238. It follows the customary process for copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid. Useful fluorine-containing monomers include hexafluoropropene (HFP), tetrafluoroethylene (TFE), chlorotrifluoroethylene (CTFE), 2-chloropentafluoropropene, perfluoroalkyl vinyl ethers, e.g. $CF_3OCF=CF_2$ or $CF_3CF_2OCF=CF_2$, 1-hydropentafluoropropene, 2-hydropentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Holland et al.). Certain fluorine-containing di-olefins are also useful, such as perfluorodiallylether and perfluoro-1,3-butadiene. Said fluorine-containing monomer may also be copolymerized with fluorine-free terminally unsaturated monoolefin comonomers, e.g., ethylene or propylene. Preferably at least 50% by weight of all monomers in a polymerizable mixture are fluorine-containing. Said fluorine-containing monomer may also be copolymerized with iodine- or bromine-containing cure-site monomers in order to prepare peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1.

Useful fluoropolymer materials include commercially available fluoropolymers, for example, THV 500 fluoropolymer (available from 3M), Kynar™ 740 fluoropolymer (available from Atochem), and Fluorel™ FC-2178 fluoropolymer (available from 3M).

The di- or polyamines useful in this invention are aliphatic amines of molecular weight less than 1,000. By "aliphatic" is meant that the nitrogen atoms of at least two amines in the compound are bonded directly to only hydrogens or to aliphatic carbon atoms rather than being bonded directly to aromatic moieties or functional groups (e.g., carboxyl). For example, as "aliphatic amine" is used in this specification and claims, aniline and urea are not aliphatic amines. Secondary, amines are more preferred than tertiary amines and primary amines are most preferred. Most preferred are alkylene polyamines or diamines, such as hexamethylene diamine and dodecyl diamine, comprising at least 2 primary amines.

Polyamides useful as the hydrocarbon layer are generally commercially available. For example, polyamides such as any of the well-known Nylons are available from a number of sources. Particularly preferred polyamides are nylon 6, nylon 6,6, nylon 11, or nylon 12. It should be noted that the selection of a particular polyamide material should be based upon the physical requirements of the particular application for the resulting article. For example, nylon 6 and nylon 6,6 offer higher heat resistant properties than nylon 11 or nylon 12, whereas nylon 11 and nylon 12 offer better chemical resistant properties. In addition to those polyamide materials, other nylon material such as nylon 6,12, nylon 6,9, nylon 4, nylon 4,2, nylon 4,6, nylon 7, and nylon 8 may also be used. Ring containing polyamides, e.g., nylon 6,T and nylon 6,I may also be used. Polyether-based polyamides, such as Pebax™ polyamides may also be used.

The polyolefin polymers are generally homopolymers or copolymers of ethylene or propylene, for example, copolymers with vinyl acetate or acrylic monomers. Carboxyl, anhydride, or imide, functionalities are generally incorporated into the polyolefin by copolymerizing with functional monomers, for example, acrylic acid or maleic anhydride, or by modifying a polyolefin after polymerization. The carboxyl, anhydride, or imide functional polyolefins useful as the hydrocarbon layer are generally commercially available. For example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes are available from DuPont, Wilmington, Del. as Bynel™ coextrudable adhesive resins.

Coating of the di- or polyamine may be by conventional means. For example, one useful method is to place the di- or polyamine in a solution which is coated onto the fluoropolymer layer, the hydrocarbon layer, or both. The two layers can then be brought together by any suitable method, such as, for example, extrusion coating or lamination. Other standard coating methods which can be used include brushing, spraying, roll-coating, and extruding (generally a melt).

The heat and pressure of the method by which the layers are brought together, may be adequate to provide sufficient adhesion. However, it may be desirable to further treat the resulting multi-layer composition, for example, with additional heat or pressure or both. One way of supplying extra heat when the multi-layer composition is prepared by extrusion is by delaying the cooling of the composition because the composite is hot as a result of the extrusion process. Where additional heating or pressure is desired, it may be accomplished by performing the steps of applying or extruding at a temperature higher than necessary for merely processing the several components. Alternatively, the finished article may be held at an elevated temperature for an extended period of time, or the finished article may be placed in a separate means for elevating the temperature of the article, such as an oven or heated liquid bath. A combination of these methods may also be used.

The methods of this invention provide multi-layer compositions with improved inter-layer adhesion. The methods and compositions of this invention are particularly useful for making articles, such as tubing and hoses, suitable for use in motor vehicles, for example as fuel-line hoses, and for films and blow-molded articles such as bottles where chemical resistance or barrier properties are important. The two-layer compositions of this invention are useful in preparing three- or more-layer compositions. For example, a three layer composition of fluoropolymer to anhydride modified polyolefin to unmodified polyolefin could be prepared might be useful as a gasket or diaphragm.

EXAMPLES

In the following Examples and Comparative Examples various multi-layer compositions were prepared and the adhesion between the layers was evaluated. All concentrations and percentages are by weight unless otherwise indicated.

Example 1

A 5% solution of hexamethylene diamine (HMDA) was made by dissolving 0.5 g of HMDA, available from Aldrich Chemical Co., in 9.5 g of E.P. grade methanol. This 5% HMDA solution was coated, using a paint brush, onto a 4 inch by 4 inch (10 cm by 10 cm) sheet of 18 mil (457 micro meters) thick Vestamid™ L2140 nylon 12 film made from resin available from Hüls Aktiengesellschaft. After the coated sheet was allowed to dry at room temperature, the coating weight of HMDA on the nylon was determined, by weighing the coated sheet, to be 1.1 mg/cm$^2$. Then, 3 layers of 10 mil (about 254 micro meters) thick sheets of THV 500 film, a terpolymer of TFE, HFP, and VDF, made from resin available from 3M Co., for a total THV 500 thickness of 30 mils (762 micro meters), was applied to the HMDA coated side of the nylon and the composite was heated under pressure using a Wabash Hydraulic Press Co. heated platen press at 177° C. and 3.5 psi (about 24 kPa) for 3 minutes. The sample was removed from the press and allowed to cool to room temperature. The resulting sample was cut into three 1-inch wide (2.54 cm) strips. Peel strength or adhesion was measured on the three strips in accordance with ASTM D 1876 (T-Peel Test).

To facilitate testing of the adhesion between the layers via a T-peel test, a sheet of 3 mil (76 micro meters) thick polyester (PET) film coated with a silicone release agent was inserted about 2.54 cm between the coated nylon 12 layer and the THV layer along one edge of the 10 cm×10 cm sample. The sheet of PET did not adhere to either material and was used only to create a THV "tab" and a nylon 12 "tab" to insert into the jaws of a test device. An Instron Model 1125 at 100 mm/min crosshead speed was used as the test device. If there were many peaks recorded on the graph from the T-peel test, the peel strength was calculated in accordance with ISO 6133-'81. The results of the three samples were averaged. The average of the three peel strength values obtained was 17.4 kg/in. The test results are summarized in Table 1.

Examples 2–11

In Examples 2–11, samples were prepared and tested as in Example 1 except that press time in minutes, temperature in °C., and the concentration of HMDA in weight % of solids were varied as shown Table 1. Also, Example 4 was made using the higher pressure of 6 MPa. The measured values of peel strength are also summarized in Table 1.

Comparative Examples C1–C5

In Comparative Examples C1 and C2, samples were prepared and tested as in Example 1 except the nylon 12 sheets were not coated with the HMDA solution. In Comparative Examples C3 and C4, samples were prepared and tested as in Example 1 except the coating on the nylon 12 sheets was only methanol. No HMDA was in the solution. In Comparative Example C5, samples were prepared and tested as in Example 1 except the HMDA was applied as a 1% solution and the press time was 1 minute. The test results are summarized in Table 1.

TABLE 1

| Example # | Coating conc. (%) | Temp. °C. | Time (Min.) | Peel (kg/in.) |
|---|---|---|---|---|
| 1 | 5 | 177 | 3 | 17.4 |
| 2 | 5 | 177 | 1 | 4.0 |
| 3 | 5 | 177 | 6 | 22.5 |
| 4 | 5 | 177 | 3 | 22.5 |
| 5 | 5 | 163 | 3 | 12.4 |
| 6 | 5 | 190 | 3 | 29.5 |
| 7 | 1 | 177 | 3 | 3.0 |
| 8 | 1 | 177 | 6 | 3.2 |
| 9 | 2 | 177 | 3 | 9.8 |
| 10 | 10 | 177 | 3 | 27.5 |
| 11 | 30 | 177 | 3 | 29.5 |
| C1 | — | 177 | 3 | 0.2 |
| C2 | — | 177 | 6 | 0.2 |
| C3 | 0 | 177 | 3 | 0.2 |
| C4 | 0 | 177 | 6 | 0.2 |
| C5 | 1 | 177 | 1 | 0.1 |

The data in Table 1 show that samples coated with the diamine-containing solutions provide improved peel strength compared to samples without diamine. The time at the indicated temperature is important, as is the diamine concentration.

Examples 12–24

In Examples 12–24, samples were prepared and tested as in Example 1 except that the HMDA solution was replaced by a 5% solution of various materials listed in Table 2. The test results and materials used are summarized in Table 3.

TABLE 2

| Chemical | Source |
|---|---|
| 1,12-dodecyl diamine (DDDA) | AC |
| diethylene triamine (DETA) | AC |
| ketimine of DETA (Epon ™ H3) | SC |
| N,N'-dicinnamilidene-1,6-hexandiamine (Diak ™ #3) | D |
| 1,3-diamino-2-hydropropane (DAHP) | AC |
| 2,4-diamino-6-methyl-1,3,5-triazine (DAMT) | AC |
| 1,4-bis(3-aminopropyl)-piperazine (BAPP) | AC |
| 4,4'-methylene bis-(cyclohexylamine) (MBCHA) | AC |
| 4,4'-ethylenedianiline (EDA) | AC |
| Tris (2-aminoethyl)amine (TAEA) | AC |
| polyether diamine (Jeffamine ™ EDR-148) | TC |
| 1,3-bis(3-aminopropyl)-tetramethyldisiloxane (BAPTS) | SL |
| 3-aminopropyltriethoxysilane (A-1100) | UC |
| N,N'-dimethylhexanediamine (DMHDA) | AC |
| N,N,N',N'-tetramethyl-hexanediamine (TMHDA) | AC |
| hexyl amine | AC |
| urea | AC |
| melamine | AC |
| triphenyl benzyl phosphonium chloride (TPBPCl) | |

AC means Aldrich Chemical Company. D means E. I. DuPont de Nemours Co. SC means Shell Chemical Co. TC means Texaco, Inc. SL means Silar Laboratories, Inc. UC means Union Carbide

TABLE 3

| Example # | Coating Solids | Time (Min.) | Peel (kg/in.) |
|---|---|---|---|
| 12 | DDDA | 3 | 16.4 |
| 13 | DETA | 3 | 14.4 |
| 14 | Epon ™ H3 | 3 | 16.0 |

TABLE 3-continued

| Example # | Coating Solids | Time (Min.) | Peel (kg/in.) |
|---|---|---|---|
| 15 | Diak ™ #3 | 3 | 15.6 |
| 16 | DAHP | 3 | 14.8 |
| 17 | BAPP | 3 | 15.9 |
| 18 | MBCHA | 3 | 12.9 |
| 19 | TAEA | 3 | 16.4 |
| 20 | Jeffamine ™ EDR-148 | 3 | 18.4 |
| 21 | BAPTS | 3 | 18.3 |
| 22 | A-1100 | 3 | 20.0 |
| 23 | DMHDA | 3 | 13.2 |
| 24 | TPBPCl HMDA | 1 | 9.3 |

The data in Table 3 show that many other aliphatic diamines also dramatically increase the peel strength between the layers compared to samples without aliphatic diamine (see, e.g., data in Table 4). Note that the compounds used in Examples 14 and 15 are blocked amines that form primary amines upon heating or moisture. Note the silane used in Example 22 condenses within itself to form di- or polyamines.

Comparative Examples C6 and C7

In Comparative Examples C6 and C7, samples were prepared and tested as in Example 1 except the coating was a 5% solids solution of hexyl amine instead of HMDA. The components, process conditions, and test summarized in Table 4.

Comparative Examples C8–C15

In Comparative Examples C8–C15, samples were prepared and tested as in Example 1 except the coating solutions contained amine components which were not di- or poly-amine functional, or which contained only tertiary amine functionality, or contained some aromatic nature, or were not aliphatic or alkyl substituted amines. The components, process conditions, and test results are summarized in Table 4. Also, the EDA was dissolved in tetrahydrofurane (THF) instead of methanol.

TABLE 4

| Example # | Coating Solids | Time (Min.) | Peel (kg/in.) |
|---|---|---|---|
| C6 | hexyl amine | 3 | 0.2 |
| C7 | hexyl amine | 6 | 0.2 |
| C8 | EDA | 3 | 0.2 |
| C9 | EDA | 6 | 0.2 |
| C10 | Urea | 3 | 0.2 |
| C11 | Melamine | 3 | 0.1 |
| C12 | DAMT | 3 | 0.1 |
| C13 | TMHDA | 3 | 0.2 |
| C14 | TMHDA | 6 | 0.4 |

The data in Table 4 show that primary mono-amines, such as hexyl amine (Comparative Examples C6 and C7 do not give significantly improved adhesion values. Aromatic-containing diamines, such as, for example those used in Comparative Examples C8, C9, and C11, do not give significantly improved adhesion. Amines containing only tertiary amines, such as, for example, the amines used in Comparative Examples C13 and C14, also do not give significantly improved adhesion. Non-alkyl substituted amines, such as, for example, the amine used in Comparative Example C10, also do not give acceptable adhesion.

Examples 25 and 26

In Examples 25 and 26, samples were made which contained a sheet of elastomer instead of the sheet of nylon 12 used in Example 1. The ingredients used in each sheet of elastomer were compounded on a two-roll mill using conventional methods. The compositions of the compounded elastomer sheets are shown in Table 3. All amounts referred to therein are in parts per 100 parts by weight rubber abbreviated "phr". Table 6 lists the sources for the ingredients in Table 5. A sheet about 2 mm thick was formed from each elastomer composition by using a two-roll mill. Samples of the invention were then prepared as in Example 1 except using the above prepared elastomer sheets instead of the nylon 12 sheet. The samples were then held in the press at 177° C. for 6 minutes instead of 3 minutes. The adhesion results of Examples 25 and 26 are shown in Table 7.

TABLE 5

Formulation of Various Elastomers

| | ACM | Vamac |
|---|---|---|
| Hytemp ™ 4051EP | 100 | |
| Vamac ™ HGB-124 | | 124 |
| N-774 Carbon Black | | 35 |
| N-550 Carbon Black | 65 | |
| Stearic Acid | 1 | 2 |
| Armeen 18D | | 0.5 |
| Diak #1 | | 1.25 |
| Diak #3 | 3 | |
| AgeRite Stalite S | 1 | |
| Diphenylguanidine | | 4 |

TABLE 6

| Chemical | Source |
|---|---|
| Hytemp ™ 4051EP (acrylic ester copolymer) | Zeon Chemical |
| Vamac ™ HGB-124 (ethylene/acrylic rubber) | E. I. DuPont |
| Stearic acid | EM Science |
| Armeen ™ 18D (octadecyl amine) | Armak Co. |
| Diak ™ #1 (hexamethylene diamine carbamate) | DuPont |
| Diak ™ #3 (See Table 2) | |
| AgeRite Stalite ™ S (mixture of octylated diphenylamine) | R. T. Vanderbilt |
| DPG (diphenyl guanidine) | American Cyanamid |

TABLE 7

| Example # | Substrate | Time (Min.) | Peel (kg/in.) |
|---|---|---|---|
| 25 | ACM | 6 | 9.0 |
| 26 | Vamac ™ | 6 | 11.6 |

The data in Table 7 show that the methods of this invention also result in greater adhesion between fluoropolymer layers and polyolefins containing carboxyl functionality.

Examples 27 and 28

In Examples 27 to 28, samples were prepared and tested as in described in Example 1 except that a 127 micro meter thick sheet (5 mil) of Kapton™ polyimide film, DuPont, and Kevlar™ aramid fiber in a woven fabric (available from DuPont) were used instead of nylon as the hydrocarbon polymer component. The results are shown in Table 8.

TABLE 8

| Example # | Substrate | Peel (kg/in.) |
|---|---|---|
| 27 | Kapton ™ | 1.5 |
| 28 | Kevlar ™ | 0.7 |

The data in Table 8 show that the methods of this invention are useful for increasing the bonding to aromatic polyamides and to polyamides.

Example 29

In Example 29, a sample was prepared and tested as in Example 1 except a 10 mil (254 micro meters) thick sheet of Bynel™ 4003 anhydride-modified high density polyethylene (AM-HDPE), resin available from DuPont, was used instead of nylon 12. Film of Bynel™ 4003 was prepared by press-molding the resin in a heated platten press at 177° C. The substrate and the test results are summarized in Table 9.

Example 30

In Example 30, a sample was made as in Example 29 except the 5% HMDA solution was coated on a sheet of Bynel™ 1123 acid-modified ethylene vinylacetate copolymer (AC-EVA), resin available from DuPont, instead of the nylon 12 sheet. A sheet of polystyrene (PS) film, available from Aldrich Chemical, was added to the composite on the uncoated side of the acid-modified ethylene vinylacetate copolymer sheet at 177° C. for 3 minutes. The peel strength was tested between the AC-EVA and the THV layers by grasping the THV layer in one jaw and the AC-EVA and PS layers in the other jaw. The substrate and the test results are summarized in Table 9.

Examples 31 and 32

In Examples 31 and 32, samples were prepared and tested in a same manner as described in Example 30 except Bynel™ E374 anhydride-modified ethylene vinylacetate copolymer (AM-EVA), available from DuPont, was used for bonding to polycarbonate (PC) film, in Example 32 and for bonding to polyethylene terephthalate (PET) film in Example 33. PC resin and the PET resin are available from Aldrich Chemical. PC film and PET film were prepared as in Example 30, except the platen press was heated to 250° C. The peel strength was tested between the AM-EVA and the THV layers by grouping the layers as in Example 30. The substrates and the test results are summarized in Table 9.

Comparative Examples C15 and C16

In Comparative Example C15, a sample was made and tested as in Example 29 except a 10 mil (254 micro meters) thick sheet of LS901046 HDPE, resin available from Quantum, was used instead of the sheet of nylon 12.

In Comparative Example C16, a sample was made and tested as in Comparative Example C15 except a 10 mil (254 micro meters) thick sheet of Bynel™ 4003 AM-HDPE, resin available from DuPont, was used and was not coated with any HMDA solution. The substrates and the test results are summarized in Table 9.

The test results and process conditions are shown in Table 9.

TABLE 9

| Example # | Substrate | Peel (kg/in.) |
|---|---|---|
| 29 | Bynel ™ 4003 AM-HDPE | 8.2 |
| 30 | Bynel ™ 1123 AC-EVA/PS | 3.4 |
| 31 | Bynel ™ E374 AM-EVA/PC | 8.2 |
| 32 | Bynel ™ E374 AM-EVA/PET | 1.5 |
| C15 | HDPE | FA |
| C16 | Bynel ™ 4003 AM-HDPE | FA |

The data in Table 9 show that polyethylene without carboxy, amide, or anhydride functionality is not useful in the method of this invention.

"FA" means the sample fell apart before they could be tested.

Example 33

In Example 33, a sample was prepared as in Example 1 except a 1 mm thick sheet of 680 denier nylon 6 fabric was used instead of the nylon 12 sheet. Even though the coating was applied to only one side of the fabric, the porosity of the fabric allowed some of the coating solution to reach the other, uncoated side of the fabric. Then, 30 mils (about 762 micro meters) of THV 500 film was applied to each side of the nylon fabric, using the press cycle and conditions of Example 1. The test for adhesion was done between the THV 500 film, which was applied to the purposely coated side of the fabric, and the fabric. The substrate and the test results are summarized in Table 11.

Example 34–37

In Examples 34–37, samples were prepared and tested as in Example 1 except that the 30 mils (about 762 micro meters) of fluoropolymer film were made from THV 200 resin, available from 3M, instead of THV 500 resin. Also, different temperatures were used in the 3 minute press cycle as shown in Table 10. THV 200 is also a terpolymer of TFE, HFP, and VDF, but with a monomer unit ratio of 42, 20 and 38 respectively. The substrates and the test results are summarized in Table 11.

Example 38

In Example 38, a sample was prepared and tested as in Example 1 except that THV 400 resin, available from 3M, was used instead of THV 500 resin. THV 400 is also a terpolymer of TFE, HFP, and VDF, but with a monomer unit ratio of 53, 18 and 29 respectively. The substrate and the test results are summarized in Table 11.

Example 39–41

In Examples 39–41, samples were prepared and tested as in Example 1 except that fluoroelastomer sheets of about 2 mm thickness were used instead of the THV 500 sheets. The 2 mm thick sheets were formed using a two-roll mill. Fluorel™ FC-2178 is a copolymer of VDF and HFP available from 3M. Fluoroelastomer A (FE-A) is a terpolymer of VDF, HFP and TFE with a Mooney viscosity ML (1+10) 121° C. greater than 100. Fluoroelastomer B (FE-B) is a terpolymer of VDF, propylene (P) and TFE with a Mooney viscosity ML (1+10) 121° C. of 60. FE-A and FE-B were made using conventional polymerization techniques and the resulting monomer unit ratios determined by NMR are listed in Table 10. The substrate and the test results are summarized in Table 11.

TABLE 10

| Monomer composition (wt %) (as determined by NMR) | | | | | |
|---|---|---|---|---|---|
| Fluoroelastomer | VDF | HFP | TFE | P | Supplier |
| Fluorel ™ FC-2178 | 62 | 38 | — | — | 3M |
| Fluoroelastomer A | 41 | 35 | 24 | — | experimental |
| Fluoroelastomer B | 3 | — | 74 | 23 | experimental |

The results and process conditions of Examples 34–42 are summarized in Table 11. All samples were held for three minutes at a pressure of 24 kPa in the press.

Comparative Examples C17 to C19

In Comparative Examples C17 to C19, samples were prepared and tested as in Example 1 except no diamine solution was coated on the nylon.

TABLE 11

| Example # | Fluoropolymer Substrate | Temperature °C. | Peel (kg/in.) |
|---|---|---|---|
| 33 | THV 500 | 177 | 4.0 |
| 34 | THV 200 | 121 | 0.4 |
| 35 | THV 200 | 149 | 7.1 |
| 36 | THV 200 | 162 | 17.0 |
| 37 | THV 200 | 177 | 24.2 |
| 38 | THV 400 | 177 | 10.7 |
| 39 | FC-2178 | 177 | 8.8 |
| 40 | FE-A | 177 | 6.6 |
| 41 | FE-B | 177 | 1.0 |
| C17 | FC-2178 | 177 | 0.4 |
| C18 | FE-A | 177 | 0.4 |
| C19 | FE-B | 177 | 0.1 |

The data in Table 11 show that fluoropolymer sheets containing VDF monomer ratios as low as 3% by wt. will improve the adhesion to polyamides when used with a diamine adhesion enhancer. Also, sufficient temperature is often needed to properly develop the adhesion. Examples 39–41 and Comparative Examples C17–C19 did not contain any curatives. After pressing at 177° C. for 3 minutes, the fluoroelastomers were not cured. In Examples 39–41, the fluoropolymer tab broke during the peel test rather than separating from the coated nylon 12 substrate, thus indicating a peel strength greater than shown in Table 11.

Example 42–46

In Examples 42–46, samples were prepared and tested as in Example 1 except the fluoropolymers shown in Table 12 were used instead of the THV 500 sheets. CTFE is chlorotrifluoroethylene, and PVDF is polyvinylidene fluoride. The fluoropolymers used and the test results are summarized in Table 13.

TABLE 12

| Fluoropolymer | Composition | Monomer Ratio (wt %) | Supplier |
|---|---|---|---|
| Kel-F ™ KF-800 | VDF/CTFE | 15/85 | 3M |
| Kynar ™ 740 | PVDF | 100 | Atochem |

TABLE 12-continued

| Fluoropolymer | Composition | Monomer Ratio (wt %) | Supplier |
|---|---|---|---|
| Kynar ™ 2800 | VDF/HFP | 90/10 | Atochem |
| Cefral soft ™ | VDF/ETFE grafted PVDF | unknown | Central Glass |

Example 47

In Example 47, a sample was prepared and tested as in Example 1 except the fluoropolymer sheet was made from 41 g of THV 500 and 41 g of Tefzel™ 210 ETFE which were mixed using a Haake Rheomix™ 600 internal mixer with roller blades at 320° C. for 6 minutes. The mixture was then molded at 270° C. to make a sheet about 10 mils (254 micro meters) thick. The molded sheet was then prepared and tested in same way as described in Example 1. The fluoropolymers used and the test results are summarized in Table 13.

Comparative Example C20

In Comparative Example C20, a sample was prepared and testes as in Example 43 except without any HMDA. Test results are summarized in Table 13.

All samples were run at a pressure of 24 kPa.

TABLE 13

| Example # | Substrate | Time (Min.) | Peel (kg/in.) |
|---|---|---|---|
| 42 | Kel-F ™ 800 | 3 | 6.2 |
| 43 | Kynar ™ 740 | 3 | 1.0 |
| 44 | Kynar ™ 2800 | 3 | 0.8 |
| 45 | Kynar ™ 2800 | 10 | 7.3 |
| 46 | Cefral soft ™ | 3 | 0.4 |
| 47 | THV 500/ Tefzel ™ 210 50/50 blend | 3 | 2.3 |
| C20 | Kel-F ™ KF-800 | 3 | 0.4 |

The data in Table 13 show improved adhesion when fluoropolymers containing VDF monomer units are used in the method of this invention.

Comparative Examples C21–C28

In Comparative Examples C21–C28, samples were prepared and tested as in Example 1 except the fluoropolymer sheets were made with materials which did not contain VDF monomer units. The temperature used to press the samples was 177° C. except for Comparative Example C22 which was pressed at 270° C. The fluoropolymer sheet thickness was about 10 mils(254 micro meters) and prepared by molding. Tefzel™ copolymer is a copolymer of ethylene and TFE (ETFE), available from DuPont. Aflon COP™ C-88A copolymer and Aflon LM™ 740 ACOP are copolymers of ethylene and TFE available from Asahi Glass. Halar™ copolymer is a copolymer of CTFE and ethylene (ECTFE) available from Ausimonte. Teflon™ PFA is a copolymer of TFE and perfluoroalkylvinylether available from DuPont and Teflon™ FEP is a copolymer of TFE and hexafluoropropylene (HFP) also available from DuPont. Comparative Example C28 used a 25 micro meter film of Tedlar™ polyvinyl fluoride (PVF), available from DuPont. The fluoropolymer used and the test results are summarized in Table

TABLE 14

| Example # | Fluoropolymer | Time (Min.) | Pressure (kPa) | Peel (kg/in.) |
|---|---|---|---|---|
| C21 | Tefzel ™ 210 | 3 | 24 | FA |
| C22 | Tefzel ™ 210 | 3 | 24 | FA |
| C23 | Aflon COP ™ C-88A | 3 | 24 | FA |
| C24 | Aflon LM ™ 740ACOP | 3 | 24 | FA |
| C25 | Halar ™ ECTFE | 3 | 24 | FA |
| C26 | Teflon ™ PFA | 3 | 24 | FA |
| C27 | Teflon ™ FEP | 3 | 24 | FA |
| C28 | Tedlar ™ PVF | 20 | 5 | FA |

The data in Table 14 show no measurable peel strength was achieved between the above non-VDF monomer unit-containing fluoropolymer materials and the polyamide sheets even with the HMDA coating applied. "FA" means the sample fell apart before they could be tested.

Various modifications and alterations of this invention will be apparent to those skilled in the art without departing from the scope and spirit of this invention and this invention should not be restricted to that set forth herein for illustrative purposes.

What is claimed is:

1. A multi-layer composition comprising a first layer comprising a fluoropolymer, a second layer in contact with said first layer comprising a hydrocarbon polymer, and an aliphatic di- or polyamine of less that 1,000 molecular weight, wherein said fluoropolymer comprises interpolymerized units derived from vinylidene fluoride, said hydrocarbon polymer is a polyamide, polyimide, or a carboxyl, anhydride, or imide functional polyolefin, substantially all of said amine is located between and in contact with said two layers, and said amine is present in an amount sufficient to increase the adhesion between said layers compared to compositions without said di- or polyamine.

2. Shaped article comprising the composition of claim 1.

3. The article of claim 2 wherein said article is a hose or a gasket.

4. The article of claim 1 wherein said fluoropolymer is a fluoroplastic and said amine is an alkylene di-primary amine.

* * * * *